United States Patent [19]

Verbeek

[11] Patent Number: 5,209,053
[45] Date of Patent: May 11, 1993

[54] INJECTION MOLDED KNIFE GUARDS

[75] Inventor: John Verbeek, Saskatchewan, Canada

[73] Assignee: Vixen Mfg. Inc., Saskatchewan, Canada

[21] Appl. No.: 669,444

[22] Filed: Mar. 13, 1991

[30] Foreign Application Priority Data

Jul. 13, 1989 [CA] Canada .................................. 605540

[51] Int. Cl.⁵ .......................................... A01D 55/00
[52] U.S. Cl. ........................................ 56/298; 56/307
[58] Field of Search ................... 56/298, 307, 310, 311

[56] References Cited

U.S. PATENT DOCUMENTS

| 2,730,858 | 1/1956 | Steiner | 56/307 |
| 3,525,203 | 8/1970 | Claas et al. | 56/311 |
| 3,553,948 | 1/1971 | White | 56/307 |
| 3,844,095 | 10/1974 | Steuerwald | 56/310 |
| 4,553,380 | 11/1985 | O'Halloran | 56/298 X |
| 4,660,361 | 4/1987 | Remillard et al. | 56/298 X |

FOREIGN PATENT DOCUMENTS 1195126 10/1985 Canada .
1547077 11/1968 France .

Primary Examiner—Thuy M. Bui
Attorney, Agent, or Firm—Adrian D. Battison; Stanley G. Ade; Murray E. Thrift

[57] ABSTRACT

Conventionally, knife guards for reciprocating cutter knives used on cutter-bar type implements are made from cast iron, forged steel, carbon steel, spring steel, malleable iron or steel or high grade alloy steel. Knife guards made of metal are not impact resistant, are not resilient and have a high level of friction between the guard and the cutter bar knives reciprocating therein which not only causes heavy wear to occur but also needs additional power to operate. The present device is injection molded from plastic and in particular, a polyimide resin such as glass filled, super tough nylon or a polyacetal based plastic resin with petroleum based lubricant bonded therewithin and can be formed in one, two or three prong configurations with or without ledger plates.

5 Claims, 3 Drawing Sheets

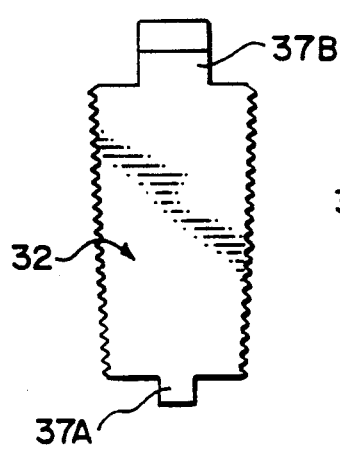
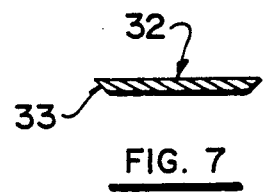
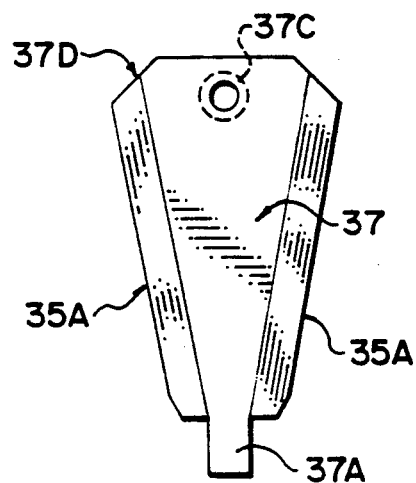
FIG. 6  FIG. 7  FIG. 8
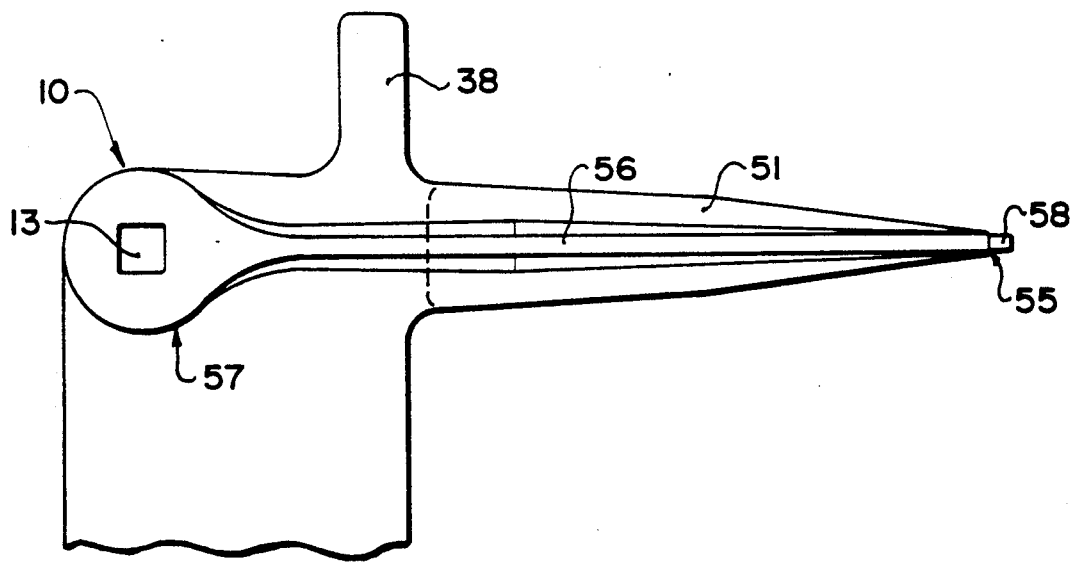
FIG. 9

INJECTION MOLDED KNIFE GUARDS

This invention relates to new and useful improvements in knife guards used on mowers, combines, swathers, windrowers and other cutter-bar implements used for cutting various forage and cereal crops. Conventionally, these knife guards are bolted to a cutting bar and a cutting knife moves back and forth through the slot of the knife guards as it is cutting the crops with the edges of the guards and the edges of the knives giving a shearing action. These are sometimes called sickle bars with the knife assembly reciprocating back and forth in a substantially horizontal plane.

The purpose of knife guards include maintaining the knife in a consistent position, protecting the cutting knife from being damaged by impact from stones and other foreign objects, to provide a surface edge or ledger for the knife to move acting as a cutting edge and to untangle crops and hold them in position for cutting.

Conventionally, knife guards are made from cast iron, forged iron or steel, carbon steel, spring steel, malleable steel or high grade alloy steel. They are generally of material hardness on Rockwell "C" test ranging from 48-60.

Various manufacturers of cutting machines require different shapes and designs for their particular machines and knife guards are conventionally manufactured in single, double or triple points.

Disadvantages of existing technology include the following:

(1) Knife guards made of currently used materials suffer a high casualty rate of impact breaks when the machinery runs into foreign objects such as stones or the like. Broken knife guards may cause a hazardous condition to the operator and sometimes mechanical damage to the harvesting machines. This is because the existing materials are not impact resistant.

(2) Conventional material used in the manufacture of knife guards suffer from a lack of resiliency which may result in many deformed or twisted knife guards caused by impact with stones, rocks or other foreign objects which in turn can cause extensive damage to the cutting knives attempting to reciprocate therein.

(3) Because of the metal to metal contact between the cutting knives and the knife guards, there is a high level of friction which causes extensive wear on both parts and requires extra power to drive the reciprocating knife assembly back and forth through the guards.

(4) Conventional metal guards are higher in cost of materials and also in production costs and the heavier metal parts incur higher handling and shipping costs.

(5) Rusting causes premature deterioration of knife guards, particularly when left outside exposed to weather.

The present invention overcomes these disadvantages and one aspect of the invention includes a knife guard for use with reciprocating knives of sickle bars and the like molded from a synthetic plastics material.

The knife guards of the present invention have particular application in the field of agricultural machinery such as mowers, swathers, windrowers, combines and other reciprocating cutter-bar devices. The knife guards are somewhat similar in configuration to the metal knife guards presently in use and they are also bolted to the cutter bar and can be injection molded in one, two or three prong configuration with or without ledger plates.

Polyamide resins such as nylon are extremely resilient and return to the original dimensions many times easier than metal, without breaking and the fatigue properties of nylon are most advantageous where vibration occurs, it being understood that high speed reciprocating knife assemblies often operate under severe vibration conditions. Furthermore, the tensile strength of such resins ensures a memory resiliency to the original shape and dimension after impact.

Glass reinforced nylon resins are virtually unbreakable from impact caused by field hazards such as stones or other foreign objects thus providing superior guarding qualities to the cutting knife assembly.

As mentioned previously, broken metal guards often cause mechanical damage to the harvesting machine and extensive damage to the cutting knife assemblies thereof.

Another advantage of the invention is that the injection molded knife guards from such materials such as nylon or the like, are approximately one seventh the weight of conventional metal guards and this weight reduction solves a weight problem which often causes a hazardous condition of unbalance on the head of such machines as self-propelled swathers or combines. Furthermore, the impact resistance of the injection molded knife guards eliminates the hazard of broken pieces which may endanger the operator.

The injection molded process used for the production of these knife guards is much more efficient and more economical than the conventional manufacturing process used to manufacture forged or cast knife guards and estimated savings of up to 50% are believed to be possible. Furthermore, the lighter weight also represents cost savings in handling and shipping and one of the most important considerations is the lower coefficient of friction as the knife moves in the plastic guard thus reducing power requirements and, because of less friction, wear is substantially reduced.

The plastic resins considered for use in the manufacture of these knife guards are weather resistant and non-rusting and thermoplastic materials such as nylon or the like absorb shock loads which would crack or break metal parts.

A still further advantage of the invention is to provide a device of the character herewithin described which is simple in construction, economical in manufacture and otherwise well suited to the purpose of which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

FIG. 6 is a top plan view of one of the ledger plates;

FIG. 7 is a front view, of FIG. 6.

FIGS. 8 and 9 are a top and bottom plan view of the preferred embodiment of the ledger plate.

In the drawings like characters of reference indicate corresponding parts in the different figures.

DETAILED DESCRIPTION

Figure 1:
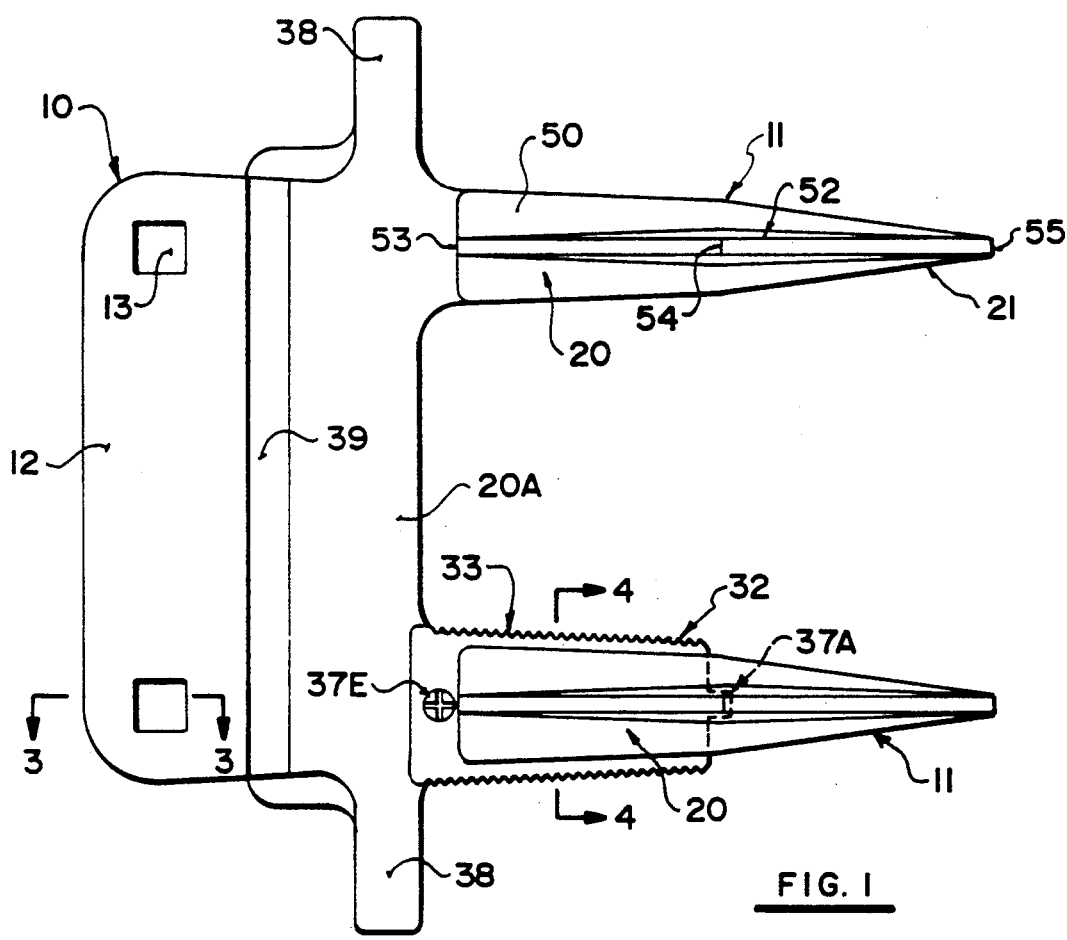
FIG. 1 is a top plan view of a two pronged knife guard formed from a synthetic plastic.

Proceeding therefore to describe the invention in detail, the knife guard shown in the drawings, includes an injection molded two prong assembly having an attaching base or support 10 with the pair of prongs 11 extending forwardly therefrom.

The attaching plate 10 includes the rear portion 12 having a pair of rectangular apertures 13 formed as a constant cross-section therethrough as indicated at 14 to receive conventional carriage bolts 15 having a rectangular body portion so that the knife guard may be secured to a cutter-bar 16 and extend forwardly therefrom. The constant cross-section and the use of carriage bolts enables the unit to be attached without special fasteners and without danger of splitting the part at the connection point.

The base also includes the rear guard strip 17 extending forwardly to the slotted guards 18 having a lower forwardly extending section 19 and an upper guide section 2 extending rearwardly from the front end 21 of the portion 19 and defining a longitudinally extending slot 22 open at each side and at the rear as indicated by reference character 23. These slots act as the guiding portions for the knife assembly collectively designated 24 and consisting of a reciprocating mounting bar 25 with a plurality of substantially triangular steel knife blades 26 riveted thereto by means of rivets 27 in a conventional manner and having the converging side edges 28 edge sharpened as indicated by reference character 29. These knives run within the slots 22 and between the upper portion and the lower portion 19 of the guard with the sharpened edges 29 of the knives sliding over the outer upper corners 30 of the lower sections 19 forming ledger edges on the base of slot 22. This shearing action cuts the grain or crop engaged between adjacent fingers or points 21 due to the reciprocal action of the knives in the direction of double headed arrow 31.

To provide an effective cutting action, ledger plates 32 are secured to the upper surface of the lower portion 19 within the slot 22, said ledger plates having side edges 33 to provide the shearing action with the knife edges 29.

Two examples of the ledger plates are shown in FIGS. 6 and 8. Each includes gradually tapered side edges widening toward the rear end of the prong. Each includes a flat surface which lies horizontal and acts as the upper guide surface 37 for the knife and parallel to the lower surface of the upper grid element. Each includes at least one end tab 37A and 37B which extends into the body of the plastics material to locate the plate on the body. In FIG. 6, the tab 37A projects into the area at the front of the prong. The tab 37B turns downwardly and then outwardly parallel to the plate 37 to engage into the portion 17. In FIG. 8, the rear tab member is omitted. In its place, a tapered hole 37C is formed through the body of the plate adjacent the rear end. This can be fastened to the plastics material by for example vibration welding, ultrasonic welding rivets or a machine screw. The plate can be molded in place or can be attached as a separate process. The plate includes tapered rear corners 37D.

Figure 4:
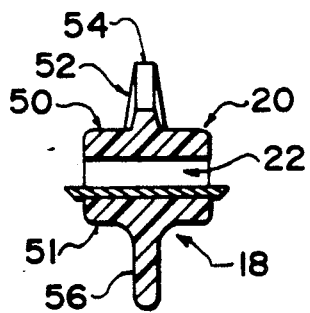
FIG. 4 is a cross-sectional view along the lines 4—4 of FIG. 1.
Figure 4A:
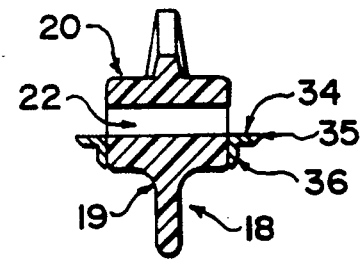
FIG. 4A is a view similar to FIG. 4 but showing an alternative form of ledger plate.
Figure 5:
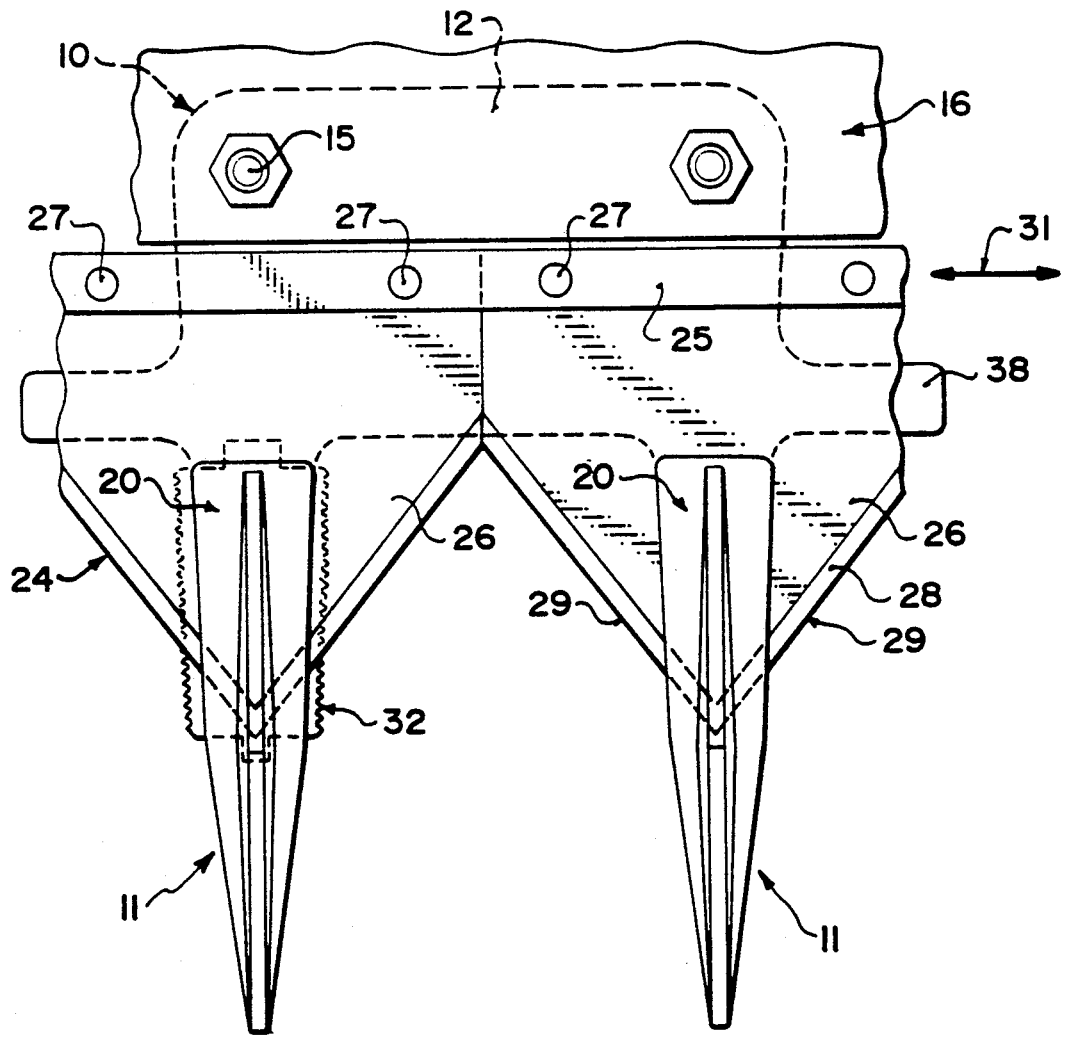
FIG. 5 is a fragmentary top plan view showing the two pronged guard of FIG. 1 installed with the knife assembly engaged therewith.

FIG. 4A shows an alternative ledger plate construction in which the ledger plates are angulated and include an upper planar flange 34 having edge serrations 35 on the outer edges thereof together with a down turn flange 36 forming a right angled portion engaging over the lower portions 19 defining the slot 22.

FIG. 8 shows the preferred embodiment in which the ledger plate 37 is straight edged as at 35A with the edges being sharpened and having a Rockwell hardness of 48-60. In all cases the ledger plates, if used, are molded into the plastic as an integral part of the guard.

Figure 2:
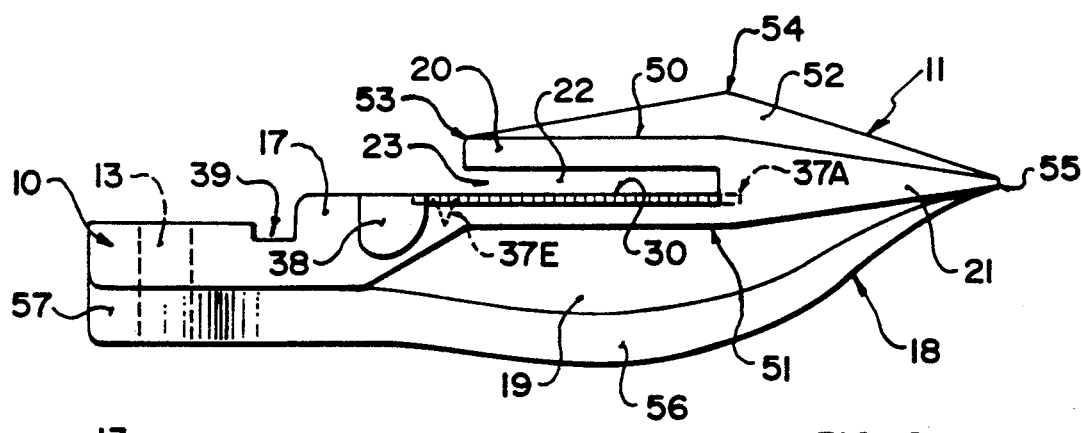
FIG. 2 is a side elevation of FIG. 1.
Figure 3:
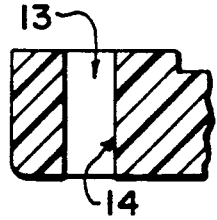
FIG. 3 is a fragmentary cross-sectional view along the lines 3—3 of FIG. 1.

Spacer rod portions 38 extend outwardly from each side of the knife guards adjacent the front part 17 of the mounting portions 10 with these parts 38 abutting against corresponding parts of the adjacent knife guard assemblies and a longitudinally extending channel 39 may be formed on the top surface of the portion 10 just rearwardly of the portion 17 of the guard as clearly shown in FIGS. 1 and 2, to receive the underside heads of the rivets 27 of the knife assembly as it reciprocates from side to side as hereinbefore described.

A transverse bar 20A between the projections 38 supports the knife. This bar is solid i.e. it is free from openings to provide an effective guide surface and to provide sufficient strength to support the prongs.

Various plastic resins may of course be used for the construction of these knife guards and include the preferred materials such as nylon resins, impact modified nylon resins, glass reinforced nylon resins or polyacetal based plastic resins having a petroleum based lubricant bonded therewithin.

Examples of preferred materials are glass reinforced nylons, such as Zytel TM nylon resins which may be impact modified or glass reinforced. Typical suitable resins include Zytel 80G-33HSL-1.

Lexan TM resin reinforced by glass fibers may also be used and suitable types include Lexan 3412, 3413 and 3414, and WR (wear resistant) grades.

Cadco TM is a further resin which is a polyacetal based plastic specifically tailored for uniform oil lubrication. A petroleum based lubricant is bonded within the plastic and cannot bleed out and gives this particular plastic reduced frictional values ideally suite for the formation of knife guards of the present application. Types include Oilon Pv TM 80.

These resins include excellent impact strength, wear factors and coefficient of friction.

Turning again to FIGS. 2 and 9, the shape of the molded body is shown in more detail so that the prong includes an upper surface 50 and a lower surface 51. On top of the upper surface is provided a rib 52 which as shown in FIG. 1 is narrower than the width of the upper surface 50 since the width of the upper surface 50 is substantially equal to the width of the prong. The rib 52 forms a shallow triangular shaped body inclined from a feathered edge 53 adjacent the rear edge of the upper guide 20 to an apex 54 approximately at the front edge of the slot 22 and down to a front feathered edge at the sharp nose of the prong indicated at 55.

On the underside of the prong is provided a further rib 56 which is similarly shaped to the rib 52 and extends from the sharp nose 55 to a rear edge of the rib at the support portion 10. The rear edge of the rib 56 opens out to form a cylindrical section 57 depending downwardly from the underside of the support portion 10 and surrounding the opening in the support portion. The rib is smoothly curved around the underside 51 so as to follow the contour of the underside 51 and gradually tapers to a feathered edge at the front nose 55.

The ribs 52 and 56 ensure structural rigidity of the part to avoid flexing of the guide during a working action. Previous proposals have allowed the guide to flex when formed from a plastic material in the expectation that this will reduce breakage. In practice however the flexibility cannot be accomodated since it misaligns the knife element and can cause the knife element to cut into the guides and particularly the upper guide 20.

The ledger plate as shown particularly in FIG. 2 is mounted in place by the front tab 37A together with a screw 37E passing through the opening 37C which is countersunk as shown in FIG. 8.

At the front nose 55 is provided a nipple 58 which is formed in the manufacture of the part by the injection of the material into the mold strictly through the front point 55 so that the material moves into the mold in a single direction and forms a part of the maximum strength.

The mounting of the ledger plate is a separate item formed after the molding process avoids stress created in the part by the necessary shrinkage. The screw 37E is preferably of the self tapping type so that it simply can be screwed into the plastic material while being received wholly within the countersunk bore in the plate. The ledger plate is thus replacable when it becomes dull or worn. The plate can be installed without difficulty. The shaped edges 37D arranged at an angle to the side edges and to the rear edge of the ledger plate avoids or reduces stress applied to the molded plastic body by the ledger plate during movement caused by the virogous action of the knife blades across the top of the ledger plate. This chamfered edge 37D thus avoids the formation of any sharp angles formed in the recess in the plastic body which would otherwise create a point of very high stress which could cause cracking of the plastic body.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A knife guard for use with reciprocating knives of a sickle bar, comprising an integrally molded body formed from a synthetic plastics material and defining a support portion for attachment to a support flange of a machine on which the knife guard is supported, a transverse bar mounted on the support portion forwardly thereof, at least one prong projecting forwardly from the transverse bar and defining a substantially sharp front nose and defining a space between the prong and a next adjacent prong, guide means on the prong rearwardly of the nose for guiding the reciprocating knife assembly and including a lower guide element and an upper guide element extending over the lower guide element and defining between the guide elements a substantially horizontally extending slot for receiving the reciprocating knife assembly, the lower guide element including a sharpened ledger plate means inserted in the plastics material, the ledger plate means forming side edges of the prong for cutting action with side edges of the knife assembly, the ledger plate means comprising a single plate member defining an upper guide surface forming an upper most surface of the lower guide element over which the reciprocating knife assembly slides, means mounting the single plate member on the prong comprising a tab member at one of front and rear ends thereof, the tab member being buried in the plastics material and screw fastener means mounted in a countersunk bore in the single plate member and engaging the plastics material, the prong having an upper surface of a width substantially equal to the width of the prong and a rib narrower than the width of the prong mounted on the upper surface and extending longitudinally of the prong from a position adjacent the sharp nose to a position adjacent a rear edge of the upper guide element.

2. The guard according to claim 1 wherein the support portion includes a pair of openings therein defined by channels of rectangular cross-section extending through the thickness of the support portion for receiving a carriage bolt.

3. The guard according to claim 1 wherein the prong has a lower surface of a width substantially equal to the width of the prong and a second rib extending along the lower surface from the position adjacent the sharp nose to a position adjacent the support portion, the second rib having a width less than that of the prong.

4. The guard according to claim 1 wherein the plate member has a rear edge and side edges thereof generally at right angles to the rear edge each defining an elongate longitudinal side edge portion and an inclined portion extending from the side edge portion to the rear edge at an angle to each of said side edge portions and said rear edge.

5. The guard according to claim 1 wherein the integral molded body is molded from said plastics material injected wholly from the sharp nose of the prong.

* * * * *